United States Patent
Cross, Jr. et al.

(10) Patent No.: US 8,090,584 B2
(45) Date of Patent: Jan. 3, 2012

(54) MODIFYING A GRAMMAR OF A HIERARCHICAL MULTIMODAL MENU IN DEPENDENCE UPON SPEECH COMMAND FREQUENCY

(75) Inventors: Charles W. Cross, Jr., Wellington, FL (US); Michael C. Hollinger, Memphis, TN (US); Igor R. Jablokov, Charlotte, NC (US); Benjamin D. Lewis, Ann Arbor, MI (US); Hilary A. Pike, Austin, TX (US); Daniel M. Smith, Raleigh, NC (US); David W. Wintermute, Boynton Beach, FL (US); Michael A. Zaitzeff, Carson City, NV (US)

(73) Assignee: Nuance Communications, Inc., Burlington, MA (US)

( * ) Notice: Subject to any disclaimer, the term of this patent is extended or adjusted under 35 U.S.C. 154(b) by 677 days.

(21) Appl. No.: 11/154,904

(22) Filed: Jun. 16, 2005

(65) Prior Publication Data

US 2006/0287866 A1    Dec. 21, 2006

(51) Int. Cl.
*G10L 21/00* (2006.01)

(52) U.S. Cl. ........ 704/275; 704/246; 704/247; 704/251; 704/252

(58) Field of Classification Search .................. None
See application file for complete search history.

(56) References Cited

U.S. PATENT DOCUMENTS

| | | | |
|---|---|---|---|
| 5,577,165 A | 11/1996 | Takebayashi et al. | |
| 5,584,052 A | 12/1996 | Gulau et al. | |
| 5,969,717 A | 10/1999 | Ikemoto | |
| 6,208,972 B1 | 3/2001 | Grant et al. | |
| 6,243,375 B1 | 6/2001 | Speicher | |
| 6,275,806 B1 | 8/2001 | Pertrushin | |
| 6,301,560 B1 * | 10/2001 | Masters | ........................ 704/251 |
| 6,513,011 B1 | 1/2003 | Uwakubo | |
| 6,606,599 B2 | 8/2003 | Grant et al. | |
| 6,856,960 B1 | 2/2005 | Dragosh et al. | |
| 6,920,425 B1 | 7/2005 | Will et al. | |

(Continued)

FOREIGN PATENT DOCUMENTS

CN    1385783    12/2002

(Continued)

OTHER PUBLICATIONS

Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

(Continued)

*Primary Examiner* — Leonard Saint Cyr
(74) *Attorney, Agent, or Firm* — Wolf, Greenfield & Sacks, P.C.

(57) ABSTRACT

Methods, systems, and computer program products are provided for modifying a grammar of a hierarchical multimodal menu that include monitoring a user invoking a speech command in a first tier grammar, and adding the speech command to a second tier grammar in dependence upon the frequency of the user invoking the speech command. Adding the speech command to a second tier grammar may be carried out by adding the speech command to a higher tier grammar or by adding the speech command to a lower tier grammar. Adding the speech command to a second tier grammar may include storing the speech command in a grammar cache in the second tier grammar.

15 Claims, 9 Drawing Sheets

U.S. PATENT DOCUMENTS

| | | |
|---|---|---|
| 6,999,930 B1 | 2/2006 | Roberts et al. |
| 7,035,805 B1 | 4/2006 | Miller |
| 7,171,243 B2 | 1/2007 | Watanabe et al. |
| 7,188,067 B2 | 3/2007 | Grant et al. |
| 7,330,890 B1 | 2/2008 | Partovi et al. |
| 7,376,586 B1 | 5/2008 | Partovi et al. |
| 7,487,085 B2 | 2/2009 | Cross |
| 7,509,659 B2 | 3/2009 | McArdle |
| 2002/0065944 A1 | 5/2002 | Hickey et al. |
| 2002/0092019 A1 | 7/2002 | Marcus |
| 2002/0099553 A1 | 7/2002 | Brittan et al. |
| 2002/0120554 A1 | 8/2002 | Vega |
| 2002/0147593 A1 | 10/2002 | Lewis et al. |
| 2002/0184610 A1 | 12/2002 | Chong et al. |
| 2003/0039341 A1 | 2/2003 | Burg et al. |
| 2003/0046316 A1 | 3/2003 | Gergic et al. |
| 2003/0046346 A1 | 3/2003 | Mumick et al. |
| 2003/0101451 A1 | 5/2003 | Bentolila et al. |
| 2003/0125945 A1* | 7/2003 | Doyle .................. 704/246 |
| 2003/0179865 A1 | 9/2003 | Stillman et al. |
| 2003/0182622 A1 | 9/2003 | Sibal et al. |
| 2003/0195739 A1* | 10/2003 | Washio ..................... 704/1 |
| 2003/0217161 A1 | 11/2003 | Balasuriya |
| 2003/0229900 A1 | 12/2003 | Reisman |
| 2003/0235282 A1 | 12/2003 | Sichelman et al. |
| 2004/0019487 A1 | 1/2004 | Kleindienst et al. |
| 2004/0025115 A1 | 2/2004 | Sienel et al. |
| 2004/0031058 A1 | 2/2004 | Reisman |
| 2004/0044516 A1 | 3/2004 | Kennewick et al. |
| 2004/0049390 A1 | 3/2004 | Brittan et al. |
| 2004/0059705 A1 | 3/2004 | Wittke et al. |
| 2004/0083109 A1* | 4/2004 | Halonen et al. ............ 704/277 |
| 2004/0120472 A1* | 6/2004 | Popay et al. ............. 379/88.01 |
| 2004/0120476 A1* | 6/2004 | Harrison et al. ......... 379/88.18 |
| 2004/0138890 A1 | 7/2004 | Ferrans et al. |
| 2004/0153323 A1 | 8/2004 | Charney et al. |
| 2004/0179038 A1 | 9/2004 | Blattner et al. |
| 2004/0216036 A1 | 10/2004 | Chu et al. |
| 2004/0236574 A1 | 11/2004 | Ativanichayaphong |
| 2004/0260562 A1 | 12/2004 | Kujirai |
| 2005/0075884 A1 | 4/2005 | Badt |
| 2005/0091059 A1* | 4/2005 | Lecoeuche ............... 704/270.1 |
| 2005/0131701 A1 | 6/2005 | Cross |
| 2005/0138219 A1 | 6/2005 | Bou-ghannam et al. |
| 2005/0138647 A1 | 6/2005 | Bou-ghannam et al. |
| 2005/0154580 A1* | 7/2005 | Horowitz et al. ................. 704/9 |
| 2005/0160461 A1 | 7/2005 | Baumgartner et al. |
| 2005/0188412 A1 | 8/2005 | Dacosta |
| 2005/0203729 A1 | 9/2005 | Roth et al. |
| 2005/0203747 A1* | 9/2005 | Lecoeuche ............... 704/270.1 |
| 2005/0261908 A1 | 11/2005 | Cross |
| 2005/0273769 A1 | 12/2005 | Eichenberger |
| 2005/0283367 A1 | 12/2005 | Cross et al. |
| 2006/0047510 A1* | 3/2006 | Ativanichayaphong et al. ............... 704/235 |
| 2006/0064302 A1 | 3/2006 | Cross et al. |
| 2006/0069564 A1* | 3/2006 | Allison et al. ............... 704/257 |
| 2006/0074680 A1 | 4/2006 | Cross |
| 2006/0075120 A1 | 4/2006 | Smit |
| 2006/0111906 A1 | 5/2006 | Cross |
| 2006/0122836 A1 | 6/2006 | Cross |
| 2006/0123358 A1* | 6/2006 | Lee et al. ..................... 715/809 |
| 2006/0136222 A1 | 6/2006 | Cross |
| 2006/0146728 A1 | 7/2006 | Engelsma et al. |
| 2006/0168095 A1 | 7/2006 | Sharma et al. |
| 2006/0168595 A1 | 7/2006 | McArdle |
| 2006/0184626 A1 | 8/2006 | Agapi |
| 2006/0190264 A1 | 8/2006 | Jaramillo |
| 2006/0218039 A1 | 9/2006 | Johnson |
| 2006/0229880 A1 | 10/2006 | White |
| 2006/0235694 A1 | 10/2006 | Cross |
| 2006/0287845 A1 | 12/2006 | Cross et al. |
| 2006/0287865 A1 | 12/2006 | Cross et al. |
| 2006/0287866 A1 | 12/2006 | Cross et al. |
| 2006/0288309 A1 | 12/2006 | Cross et al. |
| 2007/0265851 A1 | 11/2007 | Cross et al. |
| 2007/0274296 A1 | 11/2007 | Cross et al. |
| 2007/0274297 A1 | 11/2007 | Cross et al. |
| 2007/0288241 A1 | 12/2007 | Cross et al. |
| 2007/0294084 A1 | 12/2007 | Cross |
| 2008/0065386 A1 | 3/2008 | Cross et al. |
| 2008/0065387 A1 | 3/2008 | Cross et al. |
| 2008/0065388 A1 | 3/2008 | Cross et al. |
| 2008/0065389 A1 | 3/2008 | Cross et al. |
| 2008/0065390 A1 | 3/2008 | Ativanichayaphong et al. |
| 2008/0086564 A1 | 4/2008 | Putman et al. |
| 2008/0140410 A1 | 6/2008 | Cross et al. |
| 2008/0162136 A1 | 7/2008 | Ativanichayaphong et al. |
| 2008/0177530 A1 | 7/2008 | Cross et al. |
| 2008/0195393 A1 | 8/2008 | Cross et al. |
| 2008/0208584 A1 | 8/2008 | Cross et al. |
| 2008/0208585 A1 | 8/2008 | Ativanichayaphong et al. |
| 2008/0208586 A1 | 8/2008 | Ativanichayaphong et al. |
| 2008/0208587 A1 | 8/2008 | Ben-David et al. |
| 2008/0208588 A1 | 8/2008 | Cross et al. |
| 2008/0208589 A1 | 8/2008 | Cross et al. |
| 2008/0208590 A1 | 8/2008 | Cross et al. |
| 2008/0208591 A1 | 8/2008 | Ativanichayaphong et al. |
| 2008/0208592 A1 | 8/2008 | Cross et al. |
| 2008/0208593 A1 | 8/2008 | Ativanichayaphong et al. |
| 2008/0208594 A1 | 8/2008 | Cross et al. |
| 2008/0228494 A1 | 9/2008 | Cross et al. |
| 2008/0228495 A1 | 9/2008 | Cross et al. |
| 2008/0235021 A1 | 9/2008 | Cross et al. |
| 2008/0235022 A1 | 9/2008 | Cross et al. |
| 2008/0235027 A1 | 9/2008 | Cross |
| 2008/0235029 A1 | 9/2008 | Cross et al. |
| 2008/0249782 A1 | 10/2008 | Ativanichayaphong et al. |
| 2008/0255850 A1 | 10/2008 | Cross et al. |
| 2008/0255851 A1 | 10/2008 | Cross et al. |

FOREIGN PATENT DOCUMENTS

| | | |
|---|---|---|
| CN | 1385783 A | 12/2002 |
| CN | 1564123 A | 1/2005 |
| EP | 0794670 A | 9/1997 |
| EP | 1450350 | 8/2004 |
| JP | 2000155529 A | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005, pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. ; PCT/EP2008/051358.

PCT Search Report, Jun. 18, 2008; PCT Application No. ; PCT/EP2008/051363.

Didier Guillevic, et al.,Robust Semantic Confidence Scoring ICSLP 2002: 7th International Conference on Spoken Language Processing. Denver Colorado, Sep. 16-20, 2002 International Conference on Spoken Language Processing (ICSLP), Adelaide: Causal Productions, Al, Sep. 16, 2002, p. 853, XP007011561 ISBN:9788-1-876346-40-9.

U.S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.
U.S. Appl. No. 10/924,520, filed Aug. 24, 2004, Charles W. Cross.
U.S. Appl. No. 10/924,112, filed Sep. 20, 2004, Charles W. Cross.

U.S. Appl. No. 10/870,517, filed Jun. 17, 2004, Charles W. Cross.
U.S. Appl. No. 10/441,839, filed May 20, 2003, Soonthom Ativanichayaphong.
U.S. Appl. No. 11/062,731, filed Feb. 22, 2005, David Jaramillo.
U.S. Appl. No. 11/007,830, filed Dec. 8, 2004, Charles W. Cross.
U.S. Appl. No. 10/945,119, filed Sep. 20, 2004, Charles W. Cross.
U.S. Appl. No. 11/022,464, filed Dec. 22, 2004, Charles W. Cross.
U.S. Appl. No. 11/741,997, filed Dec. 19, 2003, Akram Boughannam.
U.S. Appl. No. 10/741,499, filed Dec. 19, 2003, Akram Boughannam.
U.S. Appl. No. 11/056,493, filed Feb. 11, 2005, Ciprian Agapi.
U.S. Appl. No. 11/093,545, filed Mar. 30, 2005, Marc White.
U.S. Appl. No. 11/105,865, filed Apr. 14, 2005, Charles W. Cross.
U.S. Appl. No. 10/849,642, filed May 19, 2004, Charles W. Cross.
U.S. Appl. No. 10/992,979, filed Nov. 19, 2004, Charles W. Cross.
U.S. Appl. No. 10/733,610, filed Dec. 11, 2003, Charles W. Cross.

* cited by examiner

MODIFYING A GRAMMAR OF A HIERARCHICAL MULTIMODAL MENU IN DEPENDENCE UPON SPEECH COMMAND FREQUENCY

BACKGROUND OF THE INVENTION

1. Field of the Invention

The field of the invention is data processing, or, more specifically, methods, systems, and products for modifying a grammar of a hierarchical multimodal menu.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through other modes, such as multimodal access. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

A multimodal application is an application capable of receiving multimodal input and interacting with users through multimodal output. Such multimodal applications typically support multimodal interaction through hierarchical menus that may be speech driven. Such speech driven menus have a grammar that is subdivided to provide a limited grammar at each tier of the hierarchical menu. Such subdivided limited grammars are assigned to a particular tier in the hierarchical menu that corresponds to the menu choices presented to a user at that tier. A user may navigate each tier of the menu by invoking speech commands in the limited subdivided grammars of that tier that correspond to the menu choices before the user. Only the limited grammars corresponding to the user's current menu choices are typically enabled and therefore available as speech commands for the user. These limited subdivided grammars can typically support more keywords and therefore are often underutilized. Such grammars are typically static despite the frequency a user may invoke a particular speech command. Such grammars therefore often require a user to repeatedly navigate deeper into the hierarchical menu than would otherwise be necessary. There is therefore an ongoing need for modifying grammars of hierarchical multimodal menus in dependence upon speech command frequency.

SUMMARY OF THE INVENTION

Methods, systems, and computer program products are provided for modifying a grammar of a hierarchical multimodal menu that include monitoring a user invoking a speech command in a first tier grammar, and adding the speech command to a second tier grammar in dependence upon the frequency of the user invoking the speech command. Adding the speech command to a second tier grammar may be carried out by adding the speech command to a higher tier grammar or by adding the speech command to a lower tier grammar. Adding the speech command to a second tier grammar may include storing the speech command in a grammar cache in the second tier grammar.

Adding the speech command to a second tier grammar may also be carried out by maintaining a use count for the speech command and including the speech command in the second tier grammar if the value of the use count counter exceeds a maximum value of a use threshold. Adding the speech command to a second tier grammar may also be carried out by maintaining a use count for the speech command and including the speech command in the second tier grammar if the value of the use count is below a minimum value of a use threshold.

In some embodiments of the present invention, the first tier grammar is associated with a first GUI menu and the second tier grammar is associated with a second GUI menu. Some such embodiments include adding a GUI object associated with the speech command to the second GUI menu.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for modifying a grammar of a hierarchical multimodal menu. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Figure 1:
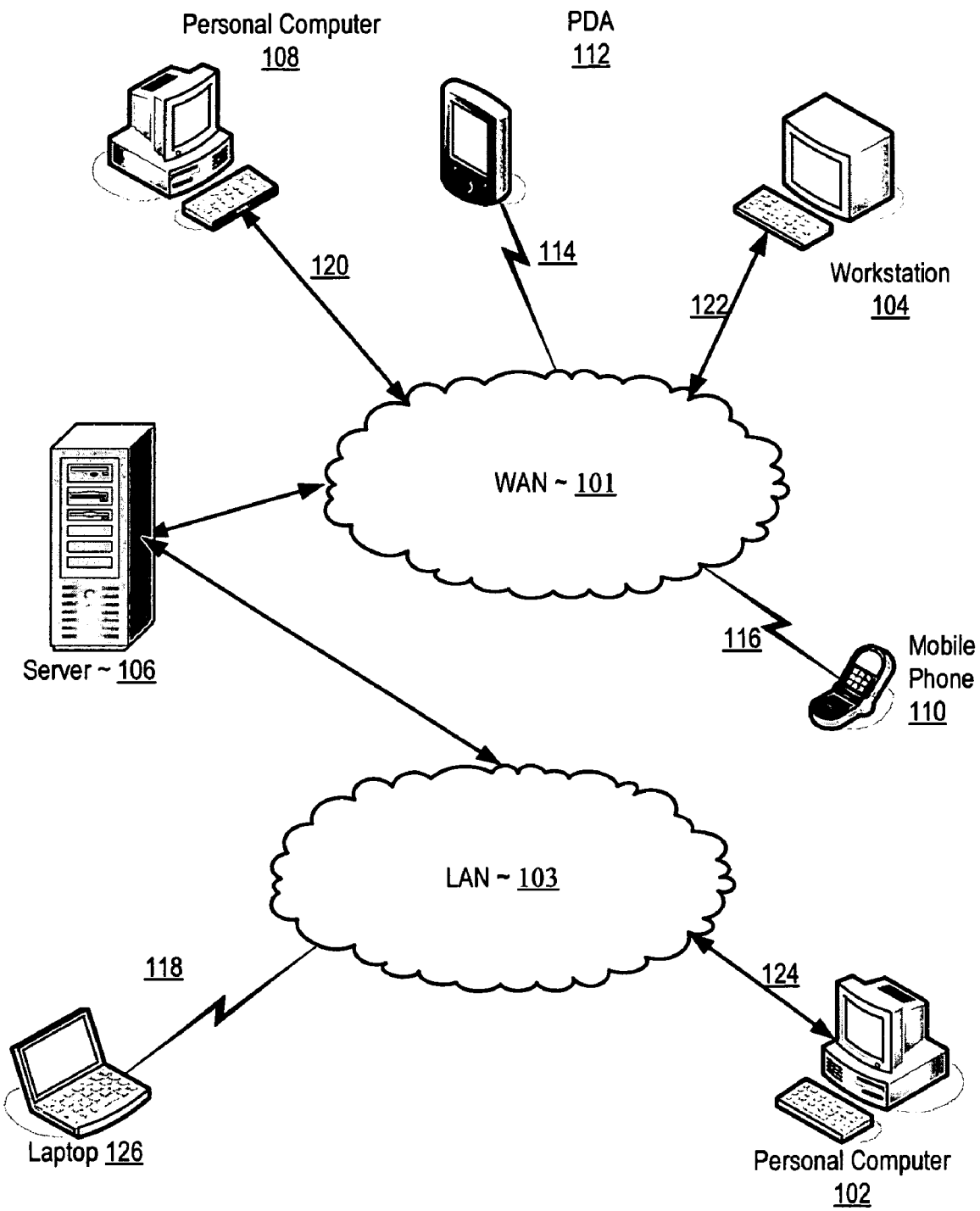
FIG. 1 sets forth a network diagram illustrating an exemplary system of devices each of which is capable of supporting a multimodal application that operates in accordance with the present invention.

Modifying a Grammar of a Hierarchical Multimodal Menu in Dependence Upon Speech Command Frequency Exemplary methods, systems, and products for modifying a grammar of a hierarchical multimodal menu in dependence upon speech command frequency according to embodiments of the present invention are described with reference to the accompanying drawings, beginning with FIG. 1. FIG. 1 sets forth a network diagram illustrating an exemplary system of devices each of which is capable of supporting a multimodal application such as a multimodal browser capable of displaying multimodal web pages according to embodiments of the present invention. The system of FIG. 1 includes a number of computers connected for data communications in networks. Each of the computers of the system of FIG. 1 may have a multimodal application, such as a multimodal web browser, installed upon it.

The data processing system of FIG. 1 includes wide area network ("WAN") (101) and local area network ("LAN") (103). The network connection aspect of the architecture of FIG. 1 is only for explanation, not for limitation. In fact, systems having multimodal applications capable of modifying grammars in hierarchical menus according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, server (106) implements a gateway, router, or bridge between LAN (103) and WAN (101). Server (106) may be any computer capable of accepting a request for a resource and responding by providing the resource to the requester. One example of such a server is an HTTP ('HyperText Transport Protocol') server or 'web server.' The exemplary server (106) is capable of serving up multimodal web pages that are capable of being displayed through a multimodal browser. The exemplary server of FIG. 1 is capable of supporting a multimodal web application having a grammar modification module according to the present invention. Such grammar modification modules are capable generally of modifying a grammar of a hierarchical multimodal menu that includes monitoring a user invoking a speech command in a first tier grammar and adding the speech command to a second tier grammar in dependence upon the frequency of the user invoking the speech command. The phrases 'first tier' and 'second tier' of a hierarchical multimodal menu are used for explanation only to distinguish two tiers in the menu. In fact, either the first tier or the second tier may be a higher or lower tier in the hierarchical menu. Grammars so modified are advantageously custom tailored for a user to provide speech commands in appropriate tiers in the multimodal menu.

In the example of FIG. 1, several exemplary client devices including a PDA (112), a computer workstation (104), a mobile phone (110), and a personal computer (108) are connected to WAN (101). Network-enabled mobile phone (110) connects to the WAN (101) through a wireless link (116), and the PDA (112) connects to the network (101) through a wireless link (114). In the example of FIG. 1, the personal computer (108) connects through a wireline connection (120) to the WAN (101) and the computer workstation (104) connects through a wireline connection (122) to the WAN (101). In the example of FIG. 1, the laptop (126) connects through a wireless link (118) to the LAN (103) and the personal computer (102) connects through a wireline connection (124) to LAN (103).

In the system of FIG. 1, each of the client devices (108, 112, 104, 110, 126, and 102) are capable of supporting a multimodal browser. A 'multimodal browser' is typically a web browser capable of receiving multimodal input and interacting with users with multimodal output. Multimodal browsers typically render web pages written in XHTML+Voice (X+V). X+V provides a markup language that enables users to interact with application through spoken dialog in addition to traditional means of input such as keyboard strokes and mouse pointer action. X+V adds spoken interaction to web content by integrating the XHTML (eXtensible Hypertext Markup Language) and speech recognition vocabularies. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

Multimodal applications that support hierarchical menus having grammars modified in accordance with the present invention are generally implemented with computers, that is, with automated computing machinery. For further explanation, therefore, FIG. 2 sets forth a block diagram of automated computing machinery comprising an exemplary server (151) capable of supporting a multimodal application (188) having a grammar modification module (189) accordance to embodiments of the present invention. The server (151) of FIG. 2 includes at least one computer processor (156) or 'CPU' as well as random access memory (168) ("RAM") which is connected through a system bus (160) to processor (156) and to other components of the computer. Stored in RAM (168) is an operating system (154). Operating systems useful in computers according to embodiments of the present invention include UNIX™, Linux™, Microsoft NT™, AIX™, IBM's i5os, and many others as will occur to those of skill in the art.

Also stored in RAM (168) is a multimodal application (188) having a grammar modification grammar module (189) according to embodiments of the present invention. The grammar modification module (189) modifies a grammar of a hierarchical multimodal menu by monitoring a user invoking a speech command in a first tier grammar, and adding the speech command to a second tier grammar in dependence upon the frequency of the user invoking the speech command. Such a grammar modification module advantageously custom tailors for a user the grammars of the hierarchical multimodal menu.

Figure 2:
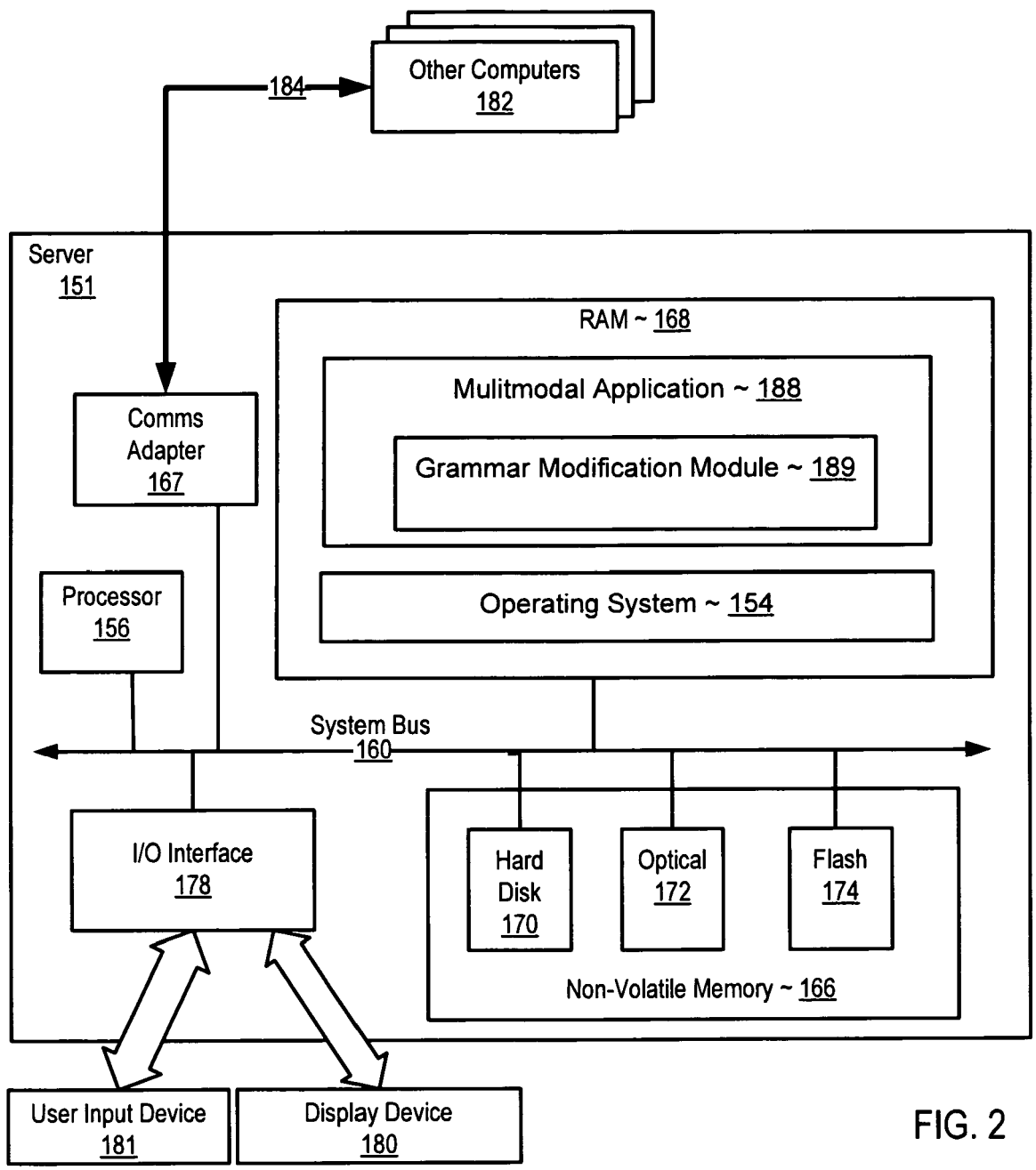
FIG. 2 sets forth a block diagram of a multimodal framework useful in implementing embodiments of the present invention.

Server (151) of FIG. 2 includes non-volatile computer memory (166) coupled through a system bus (160) to processor (156) and to other components of the server (151). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary server (151) of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary server (151) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in multimodal applications according to embodiments of the present invention include modems for wired dial-up communications, Ethernet (IEEE 802.3) adapters for wired network communications, and 802.11b adapters for wireless network communications.

Hierarchical menus having grammars modified in accordance with the present invention are generally navigated by users with multimodal browsers implemented with client devices, that is, with automated computing machinery. For further explanation, therefore, FIG. 3 sets forth a block diagram of automated computing machinery comprising an exemplary client (152) capable of supporting a multimodal browser capable of navigating a menu having a grammar modified in accordance with the present invention. The client (152) of FIG. 3 includes at least one computer processor (156) or 'CPU' as well as random access memory (168) ("RAM") which is connected through a system bus (160) to processor (156) and to other components of the computer. Stored in RAM (168) is an operating system (154). Operating systems useful in computers according to embodiments of the present invention include UNIX™, Linux™, Microsoft NT™, AIX™, IBM's i5os, and many others as will occur to those of skill in the art.

Also stored in RAM (168) is a multimodal browser (191) empowering a user to navigate a hierarchical multimodal menu that implements a grammar modified according to embodiments of the present invention. Such a grammar is modified by monitoring a user invoking a speech command in a first tier grammar, and adding the speech command to a second tier grammar in dependence upon the frequency of the user invoking the speech command.

Figure 3:
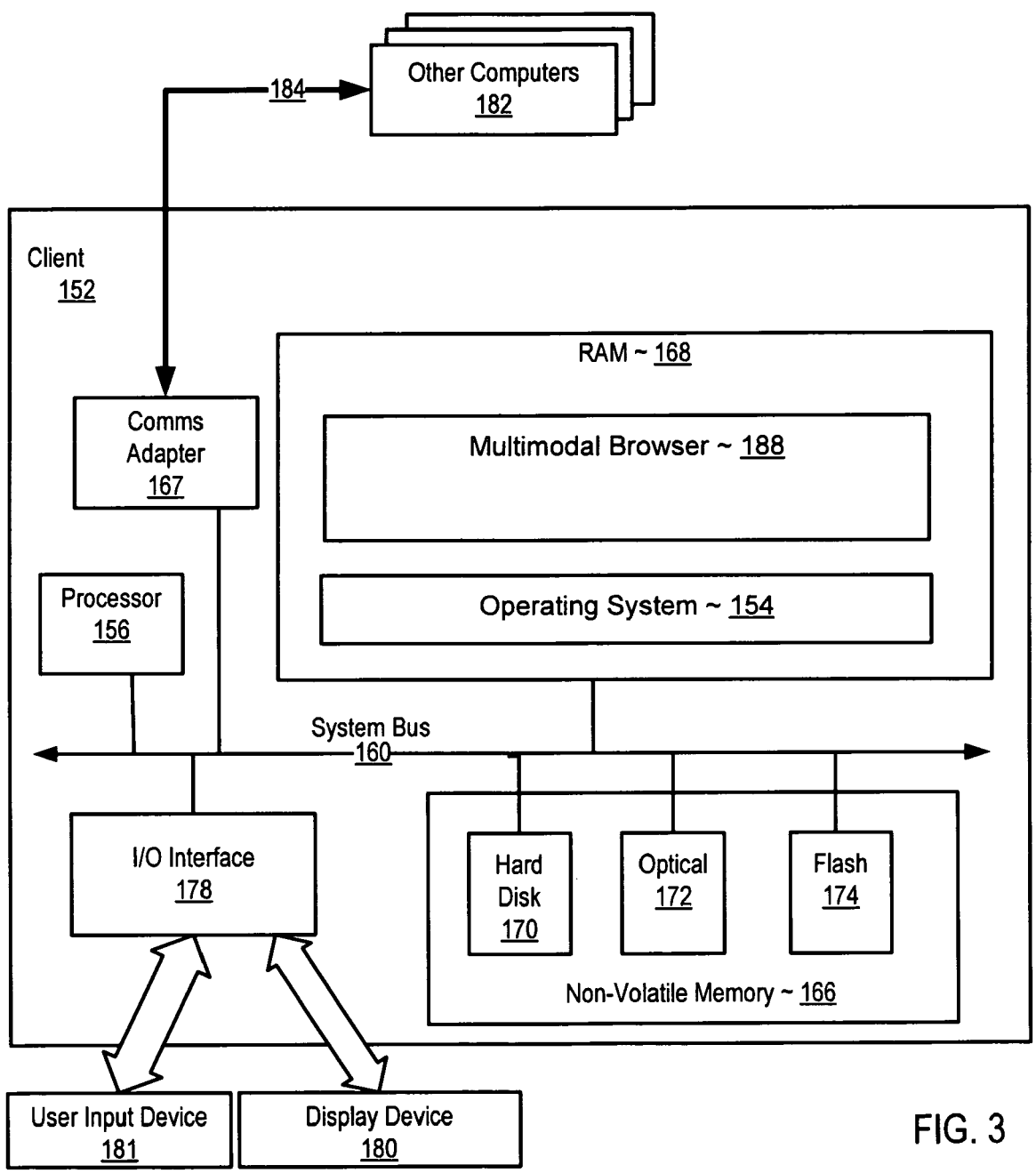
FIG. 3 sets forth a block diagram of automated computing machinery comprising an exemplary computer capable of supporting a multimodal application in accordance with the present invention.

Client (152) of FIG. 3 includes non-volatile computer memory (166) coupled through a system bus (160) to processor (156) and to other components of the client (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary client of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary client (152) of FIG. 3 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in multimodal applications according to embodiments of the present invention include modems for wired dial-up communications, Ethernet (IEEE 802.3) adapters for wired network communications, and 802.11b adapters for wireless network communications.

As discussed above, grammars according to embodiments of the present invention are modified according to the frequency a user invokes the speech commands of the grammar itself. For further explanation, FIG. 4 sets forth an exemplary method for modifying a grammar (212) of a hierarchical multimodal menu (500) according to embodiments of the present invention. The method of FIG. 4 includes monitoring (402) a user invoking a speech command (404) in a first tier grammar (406) and adding (410) the speech command (404) to a second tier grammar (408) in dependence upon the frequency of the user invoking the speech command (404). As discussed above, the phrases 'first tier' and 'second tier' of a hierarchical multimodal menu are used for explanation only to distinguish two tiers such a menu. In fact, either the first tier or the second tier may be a higher or lower tier in the hierarchical menu. Grammars so modified are advantageously custom tailored for user.

Figure 4:
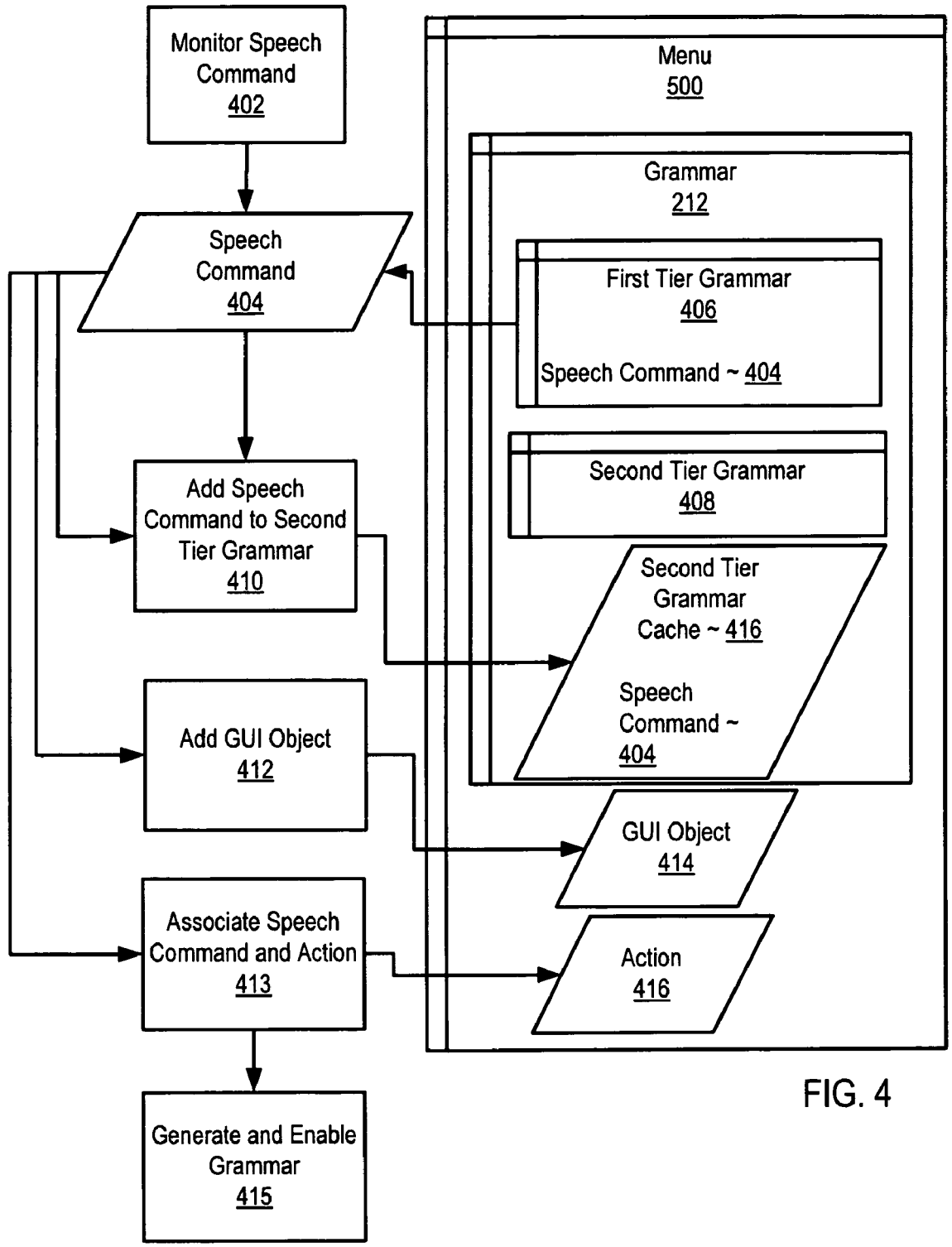
FIG. 4 sets forth a flow chart illustrating an exemplary method for modifying a grammar of a hierarchical multimodal menu in accordance with the present invention.

In the method of FIG. 4, adding (410) the speech command (404) to a second tier grammar (408) in dependence upon the frequency of the user invoking the speech command (408) is carried out by storing the speech command (404) in a grammar cache (416) associated with the second tier of the multimodal menu (500). A grammar cache (416) is memory available to a speech recognition engine that makes up a part of a grammar associated with a particular tier of the hierarchical multimodal menu and available for storing speech commands added to grammars caches in dependence upon the frequency of the user invoking the speech command (404) in another tier. Adding (410) the speech command (404) to such a grammar cache may be carried out by adding the speech command to the grammar cache first-in-first-out ('FIFO'), last-in-first-out ('LIFO') or in other ways as will occur to those of skill in the art.

In the example of FIG. 4, the first tier grammar is associated with a first GUI menu and the second tier grammar is associated with a second GUI menu. That is, each grammar is associated with a particular tier that has an associated GUI display menu for display to users. The method of FIG. 4 therefore also includes adding (412) a GUI object (414) associated with the speech command (404) to the second GUI menu. Adding such a GUI display object advantageously provides notification to the user of the speech command's new presence in the second tier grammar.

The method of FIG. 4 also includes associating (413) an action (416) with the speech command (404). Invoking a keyword typically results in an action. An action is typically a function or set of functions whose execution is invoked by the keyword. Consider for example the action goToIBM.com( ). GoToIBM.com retrieves and displays to a user an IBM webpage when the user speaks the speech command 'Go to IBM.' Such an action may be further parameterized to infer a particular page based upon the context of the keyword. Invoking actions through keywords is one of the key benefits of multimodal applications.

The method of FIG. 4 also includes generating and enabling grammar (415) using the speech commands in the grammar cache. Generating and enabling the grammar (415) advantageously makes the speech commands and keywords stored in the grammar cache effectively a part of the grammar thereby empowering a user to navigate the menu using the speech commands stored in the grammar cache.

Figure 5:
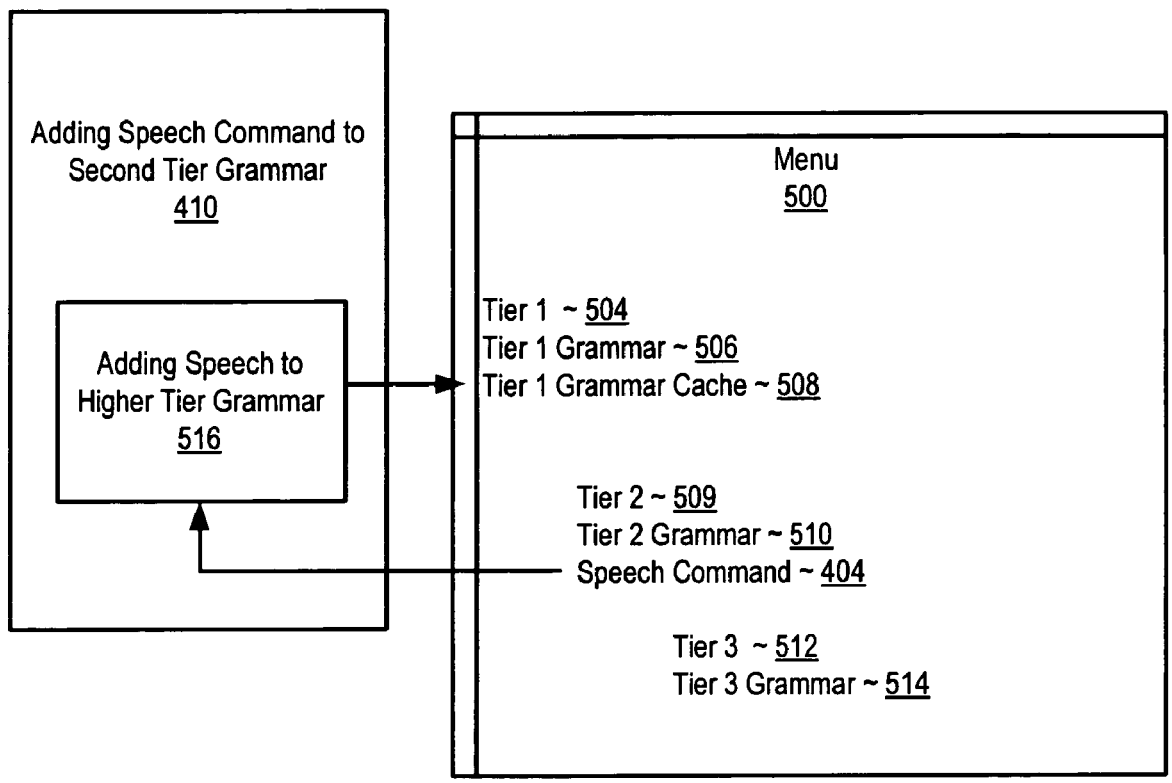
FIG. 5 sets forth an exemplary method of adding the speech command to a second tier grammar that includes adding the speech command to a higher tier grammar.

As discussed above, the phrases 'first tier' and 'second tier' of a hierarchical multimodal menu are used for explanation only to distinguish two tiers such a menu. In fact, either the first tier or the second tier may be a higher or lower tier in the hierarchical menu. For further explanation, FIG. 5 sets forth an exemplary method of adding (410) the speech command (404) to a second tier grammar that includes adding (516) the speech command (404) to a higher tier grammar (508). In the example of FIG. 5, a speech command (404) in a tier 2 grammar (510) is invoked by a user with sufficient frequency to be added to a higher tier 1 grammar (506) by including the speech command (404) in a tier 1 grammar cache (508). The example of FIG. 5 illustrates an example of a speech command that is frequently used and is therefore advantageously moved to a higher tier grammar cache. Adding the speech command to a higher tier grammar cache makes the speech command available to a user without having to navigate to tier 2 to invoke the command.

A grammar and a grammar cache is typically not visible. The inclusion the grammars and grammar caches in the example of FIG. 5 and others are for explanation and not for limitation. To notify a user of speech commands stored in a grammar or a grammar cache typically text or icons are displayed in the menu.

Figure 6:
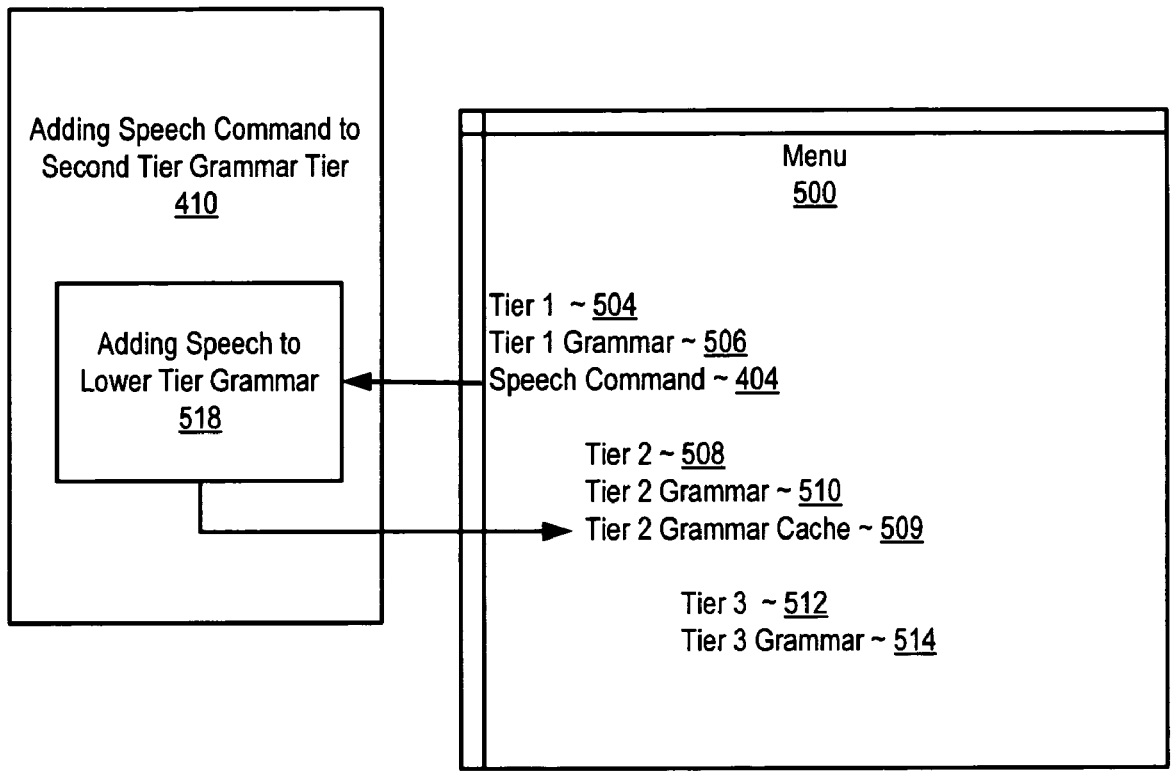
FIG. 6 sets forth a flow chart illustrating a method of adding a speech command to a second tier grammar that includes adding the speech command to a lower tier grammar.

FIG. 5 illustrates an example of adding a frequently used speech command to a higher tier grammar. Some speech commands may be infrequently used. For further explanation, therefore, FIG. 6 sets forth a flow chart illustrating a method of adding (410) a speech command to a second tier grammar that includes adding (518) the speech command (404) to a lower tier grammar (510). The example of FIG. 6 illustrates an example of a speech command that is infrequently used in its current grammar and therefore advantageously moves the speech command to a lower tier grammar cache. Consider the example of a user who for a period of time used a particular speech command frequently. A multimodal application modifying grammars according to embodiments of the present invention may move the frequently used speech command to a higher tier grammar according to the method of FIG. 6. After a period of time, however, the user ceases to use the speech command altogether and, therefore, a multimodal application modifying grammars according to embodiments of the present invention adds the speech command to the lower tier grammar returning that speech command to its original tier in the menu.

Figure 7:
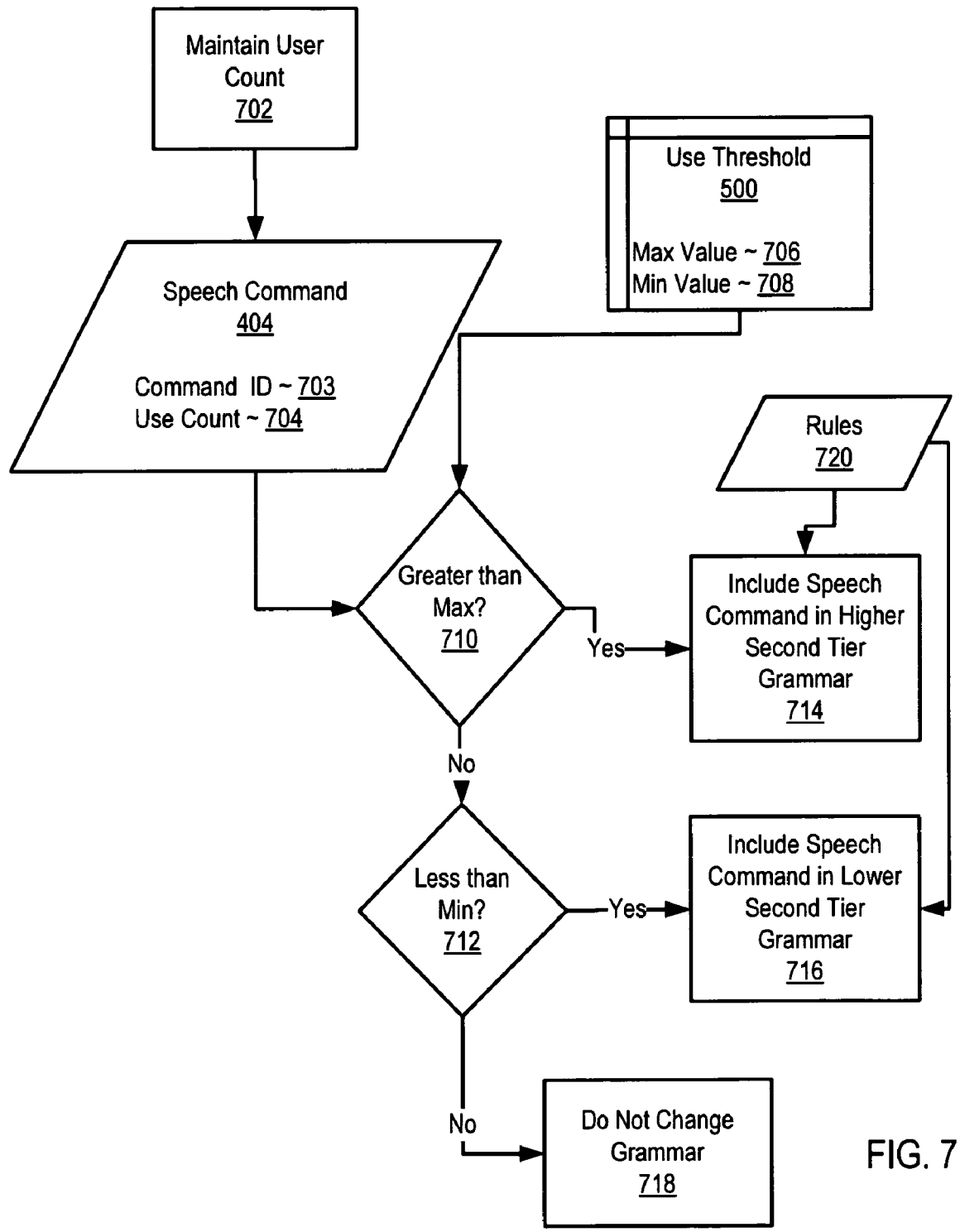
FIG. 7 sets forth an exemplary method for adding the speech command to a second tier grammar that includes maintaining a use count for the speech command.

As discussed above, adding a speech command in a first tier grammar to a second tier grammar is typically carried out in dependence upon the frequency a user invokes the speech command. One way of adding the speech command to a higher tier grammar or a lower tier grammar is carried out by maintaining a user count for the speech command and comparing the use count to a threshold to determine whether to add the speech command to a higher tier grammar, add the speech command to a lower tier grammar, or to leave the speech command in its current grammar. For further explanation, FIG. 7 sets forth an exemplary method for adding the speech command to a second tier grammar that includes maintaining (702) a use count (704) for the speech command (404). In the example of FIG. 7, a speech command is represented by a data structure uniquely identified by a speech ID (703). The speech command (404) includes a use count field (704) containing a value that is incremented when a user invokes the speech command.

The method of FIG. 7 includes comparing the use count (704) of a speech command (404) with a use threshold (500) having a maximum value (706) and a minimum value (708). The method of FIG. 7 is carried out by including (714) the speech command (404) in the higher second tier grammar if the value of the use count counter exceeds (710) the maximum value (706) of a use threshold (500) and including (716) the speech command (404) in the lower second tier grammar if the value of the use count (704) is below (712) a minimum value (708) of the use threshold (500).

In the example of FIG. 7, if the use count (704) is not greater than the maximum value (706) of the use threshold (500) and the use count (704) is not less than the minimum value (708) of the use count (500) then the method of FIG. 7 proceeds by not changing (718) the speech commands location in the grammar. That is, if the use count is between the maximum value and the minimum value of the use threshold, the method of FIG. 7 proceeds by maintaining the speech command in its current grammar.

In the method of FIG. 7, including (714) the speech command (404) in the second tier grammar and including (716) the speech command (404) in the second tier grammar is carried out in dependence upon rules (720). Rules provide a vehicle to govern the inclusion of a speech command in a particular tier grammar with greater granularity by providing additional parameters for identifying a particular tier grammar for the speech command. Examples of such parameters include user preferences, typical user preferences, context information such that a use count for a speech command not considered in a vacuum, but instead is considered in the context of other commands, or any other parameter that will occur to those of skill in the art. Rules (720) advantageously provide a vehicle to move a speech command to a grammar without simply ratcheting a speech command up and down tiers based solely on the use count of the speech command.

Modifying a grammar of a hierarchical multimodal menu according to embodiments of the present invention are carried out in dependence upon the frequency of a user invoking a speech command. The use count in the method of FIG. 7 is therefore periodically refreshed or reset to zero such that the use count is available as a measure of frequency rather than as a measure of total use. How often the use count is refreshed will vary according to factors such as the type of multimodal application, user preferences, and other factors that will occur to those of skill in the art.

Figure 8:
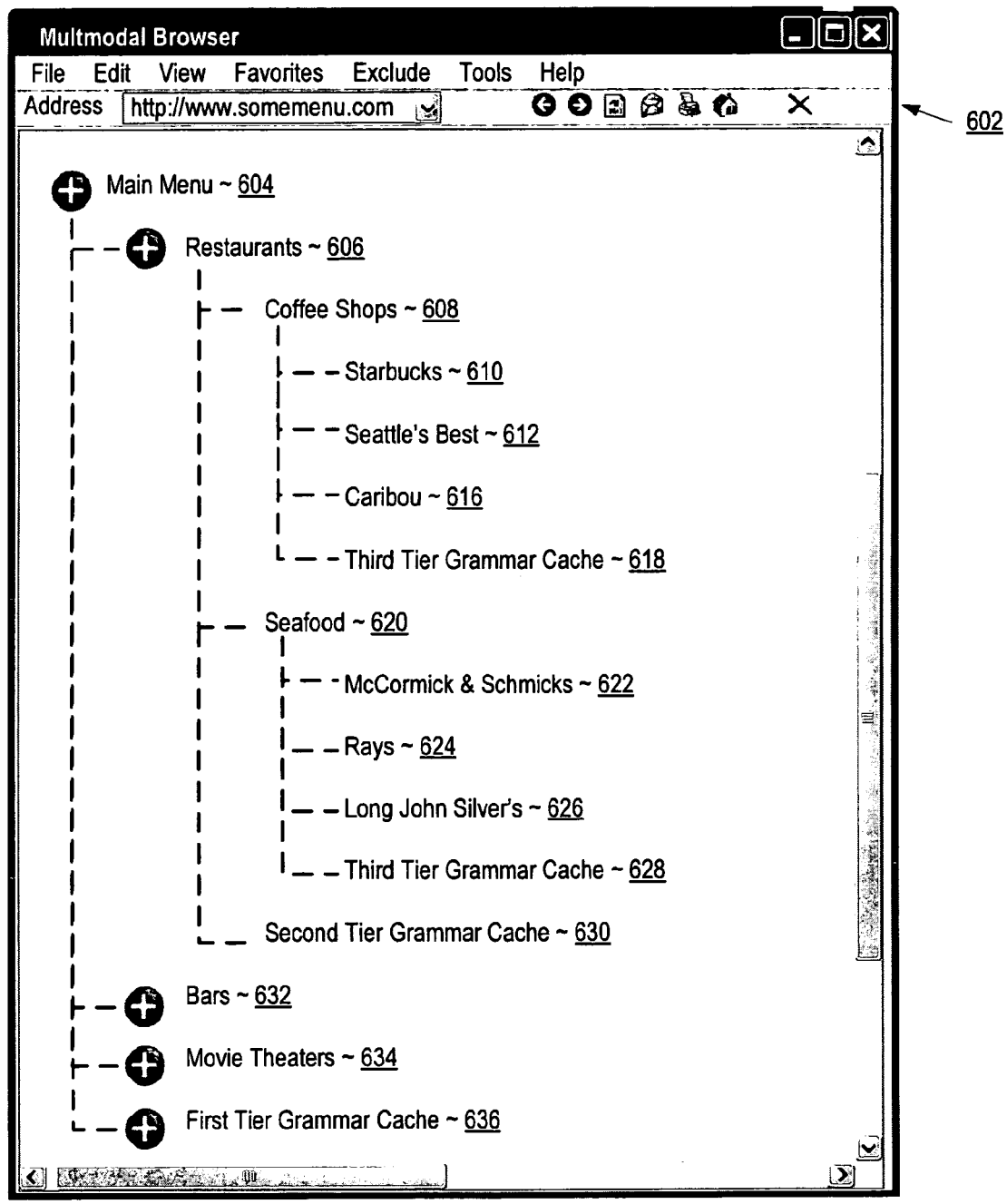
FIG. 8 sets forth a line drawing of an exemplary hierarchical multimodal menu displayed within a multimodal browser.

For further explanation, FIG. 8 sets forth a line drawing of an exemplary hierarchical multimodal menu (604) displayed within a multimodal browser (602). The exemplary menu has three first tier entries. The first tier entries include entries for restaurants (606), bars (632), and movie theatres (634). The first tier also includes a first tier grammar cache (636) for storing speech commands that are added to the first tier grammar in dependence the frequency of a user invoking the speech command in another tier grammar. The inclusion of such speech commands in the grammar cache allows a user navigating the menu (604) to invoke the speech command and any associated actions by speaking the speech command while navigating the first tier of the menu.

The exemplary menu (604) of FIG. 8 also includes a second tier having entries for coffee shops (608) and seafood (620). The second tier also includes a second tier grammar cache (630) for storing speech commands that have been added to the second tier grammar in dependence upon the frequency of a user invoking the speech command in another tier grammar. The inclusion of such speech commands in the grammar cache allows a user navigating the menu to invoke the speech command and any associated actions by speaking the speech command while navigating the second tier of the menu.

The exemplary menu (604) of FIG. 8 also includes two third tiers. One third tier has entries for the coffee shops (608) and the other third tier has entries for seafood (620). The third tier having entries for the coffee shops (608) includes entries for Starbucks (610), Seattle's Best (612), and Caribou (616). The third tier for the coffee shops also includes a third tier grammar cache (618) for storing speech commands that have been added to the third grammar in dependence upon the frequency of a user invoking the speech command in another tier grammar. The inclusion of such speech commands in the grammar cache allows a user navigating the menu to invoke the speech command and any associated actions by speaking the speech command while navigating the third tier for coffee of the menu.

In the example of FIG. 8, the third tier for seafood (620) includes entries for McCormick & Schmicks (622), Ray's (624), and Long John Silver's (626). The third tier for seafood also includes a third tier grammar cache (628) for storing speech commands that have been added to the third grammar in dependence upon the frequency of a user invoking the speech command in another tier grammar. The inclusion of such speech commands in the grammar cache allows a user navigating the menu to invoke the speech command and any associated actions by speaking the speech command while navigating the third tier for seafood of the menu.

A grammar cache is typically not visible. The display of the first tier grammar cache (636), the second tier grammar cache (630, and the third tier grammar caches (628 and 618) are therefore for explanation and not for limitation. To notify a user of a speech command in a grammar caches typically text or an icon is displayed in the menu.

Figure 9:
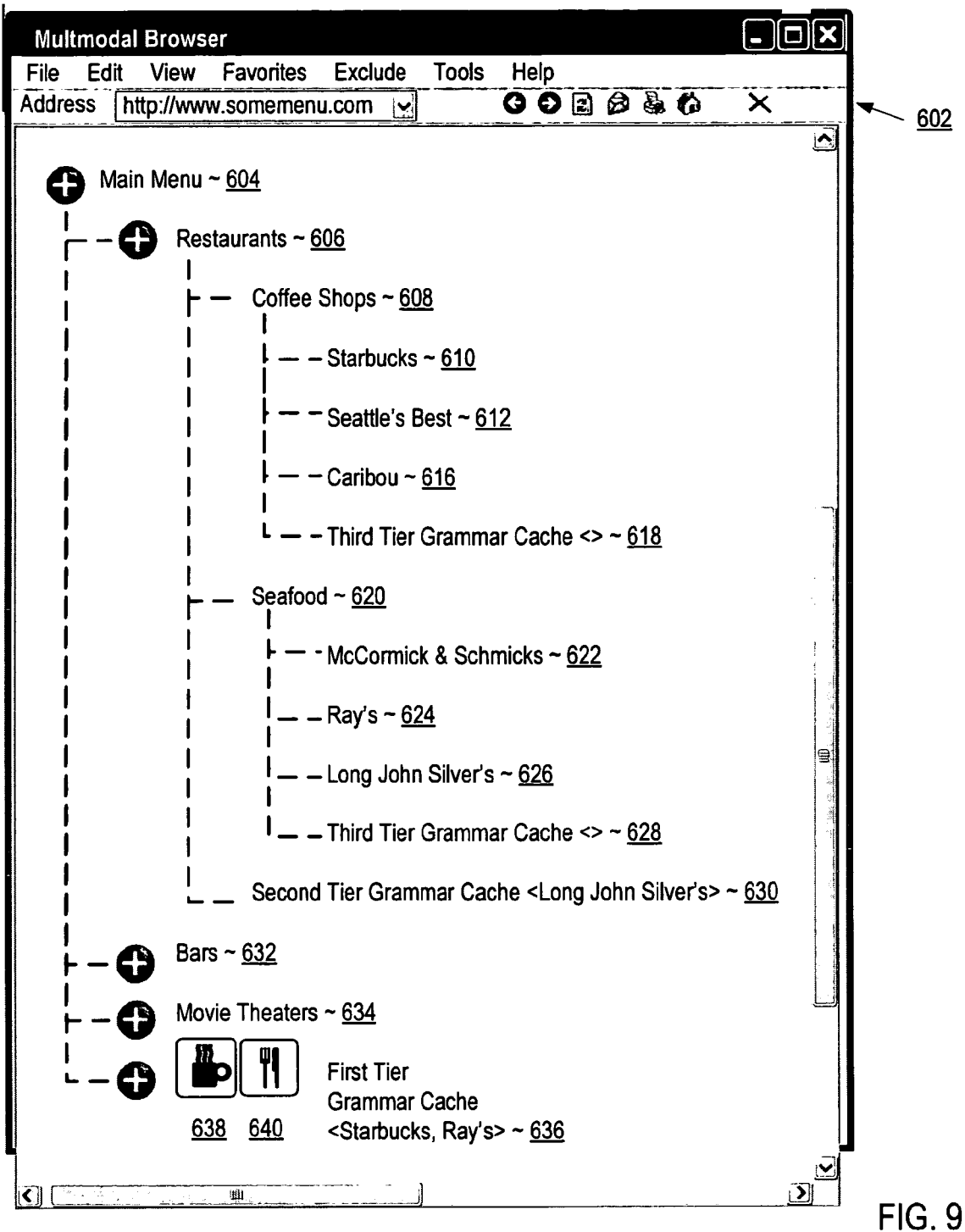
FIG. 9 sets forth the menu of FIG. 8 with a visual representation of exemplary speech commands stored in grammar caches.

For further explanation, FIG. 9 sets forth the menu of FIG. 8 with a visual representation of exemplary speech commands stored in the grammar caches in dependence upon the frequency of a user invoking the speech command in another tier grammar. In the example of FIG. 9, the first tier grammar cache (636) includes the speech commands Starbucks and Ray's. 'Starbucks' is a speech command that originally resided in the grammar for third tier for coffee of the hierarchical menu but due to the frequency of a user invoking the speech command is currently included in the first tier grammar cache. The inclusion of the speech command in the first tier grammar cache allows a user navigating the first tier to invoke the speech command by speaking the phrase 'Starbucks.'

In the example of FIG. 9, 'Ray's' is a speech command that originally resided in the grammar for third tier for seafood of the hierarchical menu but due to the frequency of a user invoking the speech command is currently included in the first tier grammar cache. The inclusion of the speech command in the first tier grammar cache allows a user navigating the first tier to invoke the speech command by speaking the phrase 'Ray's.'

As discussed above, A grammar cache is typically not visible. The display of the first tier grammar cache (636), the second tier grammar cache (630, and the third tier grammar caches (628 and 618) are therefore for explanation and not for limitation. To notify a user of the inclusion of the Starbucks speech command in the first tier grammar cache a coffee cup icon (638) representing coffee shops is included in the menu. To notify a user of the inclusion of the Ray's speech command in the first tier grammar cache a knife and fork icon (640) representing restaurants is included in the menu.

In the example of FIG. 9, 'Long John Silver's' is a speech command that originally resided in the grammar for third tier for seafood of the hierarchical menu but due to the frequency of a user invoking the speech command is currently included in the second tier grammar cache. The inclusion of the speech command in the second tier grammar cache allows a user navigating the second tier to invoke the speech command by speaking the phrase 'Long John Silver's.' In the example of FIG. 9, no icon or text is included in the menu notifying a user of the addition of the speech command in the second tier grammar cache. A user navigating the second tier may invoke the actions associated with Long John Silvers' by speaking the keyword 'Long John Silver's,' but the user is not notified with text or an icon of the inclusion of the speech command in the grammar cache.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer implemented method for modifying a grammar of a hierarchical multimodal menu comprising a plurality of tiers including a higher tier and a lower tier in a voice-enabled computing environment, the method being performed by at least one computer of the voice-enabled computing environment and comprising:

in response to receiving a first speech input from a user while the user is navigating the menu at the higher tier, comparing the first speech input to commands of a limited higher-tier grammar associated with the higher tier, the limited higher-tier grammar including commands that can be invoked when the user is navigating at the higher tier and cannot be invoked when the user is navigating at least one other tier of the hierarchical multimodal menu;

monitoring the user invoking a speech command of a limited lower-tier grammar associated with the lower tier, the limited lower-tier grammar including commands that can be invoked when the user is navigating at the lower tier, wherein the speech command is associated with an action; and adding the speech command to the limited higher-tier grammar in dependence upon the frequency of the user invoking the speech command such that when the user subsequently navigates the menu at the higher tier, the speech command added to the limited higher-tier grammar from the limited lower-tier grammar may be invoked at the higher tier.

2. The method of claim 1 wherein adding the speech command to the limited higher-tier grammar in dependence upon the frequency of the user invoking the speech command further comprises:
   maintaining a use count for the speech command;
   including the speech command in the limited higher-tier grammar in response to the value of the use count counter exceeding a value of a use threshold; and
   storing the speech command in a grammar cache in the limited higher-tier grammar.

3. The method of claim 1 wherein:
   the limited lower-tier grammar is associated with a first GUI menu and the limited higher-tier grammar is associated with a second GUI menu; and
   adding the speech command to the limited higher-tier grammar further comprises adding a GUI object associated with the speech command to the second GUI menu.

4. The method of claim 1 wherein the limited lower-tier grammar is not enabled when the limited higher-tier grammar is enabled.

5. The method of claim 1 wherein each command of the limited higher-tier grammar corresponds to a menu option of the higher tier.

6. A system for modifying a grammar of a hierarchical multimodal menu comprising a plurality of tiers including a higher tier and a lower tier in a voice-enabled computing environment, the system comprising:
   at least one processor programmed to
      in response to receiving a first speech input from a user while the user is navigating the menu at the higher tier, compare the first speech input to commands of a limited higher-tier grammar associated with the higher tier, the limited higher-tier grammar including commands that can be invoked when the user is navigating at the higher tier and cannot be invoked when the user is navigating at least one other tier of the hierarchical multimodal menu;
      monitor the user invoking a speech command of a limited lower-tier grammar associated with the lower tier, the limited lower-tier grammar including commands that can be invoked when the user is navigating at the lower tier, wherein the speech command is associated with an action; and
      add the speech command to the limited higher-tier grammar in dependence upon the frequency of the user invoking the speech command such that when the user subsequently navigates the menu at the higher tier, the speech command added to the limited higher-tier grammar from the limited lower-tier grammar may be invoked at the higher tier.

7. The system of claim 6 wherein the at least one processor is further programmed to:
   maintain a use count for the speech command;
   include the speech command in the limited higher-tier grammar in response to the value of the use count counter exceeding a value of a use threshold; and
   store the speech command in a grammar cache in the limited higher-tier grammar.

8. The system of claim 6 wherein:
   the limited lower-tier grammar is associated with a first GUI menu and the limited higher-tier grammar is associated with a second GUI menu; and
   the at least one processor is further programmed to add a GUI object associated with the speech command to the second GUI menu.

9. The system of claim 6 wherein the limited lower-tier grammar is not enabled when the limited higher-tier grammar is enabled.

10. The system of claim 6 wherein each command of the limited higher-tier grammar corresponds to a menu option of the higher tier.

11. At least one computer-readable recording storage device encoded with a plurality of instructions that, when executed by at least one processor, perform a method of modifying a grammar of a hierarchical multimodal menu comprising a plurality of tiers including a higher tier and a lower tier in a voice-enabled computing environment, the method comprising:
   in response to receiving a first speech input from a user while the user is navigating the menu at the higher tier, comparing the first speech input to commands of a limited higher-tier grammar associated with the higher tier, the limited higher-tier grammar including commands that can be invoked at the higher tier and cannot be invoked when the user is navigating at least one other tier of the hierarchical multimodal menu;
   monitoring the user invoking a speech command of a limited lower-tier grammar associated with the lower tier, the limited lower-tier grammar including commands that can be invoked when the user is navigating at the lower tier, wherein the speech command is associated with an action; and
   adding the speech command to the limited higher-tier grammar in dependence upon the frequency of the user invoking the speech command such that when the user subsequently navigates the menu at the higher tier, the speech command added to the limited higher-tier grammar from the limited lower-tier grammar may be invoked at the higher tier.

12. The at least one computer-readable device of claim 11 wherein adding the speech command to a second tier grammar in dependence upon the frequency of the user invoking the speech command further comprises:
   maintaining a use count for the speech command;
   including the speech command in the limited higher-tier grammar in response to the value of the use count counter exceeding a value of a use threshold; and
   storing the speech command in a grammar cache in the limited higher-tier grammar.

13. The at least one computer-readable recording storage device of claim 11 wherein:
   the limited lower-tier grammar is associated with a first GUI menu and the limited higher-tier grammar is associated with a second GUI menu; and
   adding the speech command to the limited higher-tier grammar further comprises adding a GUI object associated with the speech command to the second GUI menu.

14. The at least one computer-readable recording storage device of claim 11 wherein the limited lower-tier grammar is not enabled when the limited higher-tier grammar is enabled.

15. The at least one computer-readable recording storage device of claim 11 wherein each command of the limited higher-tier grammar corresponds to a menu option of the higher tier.

* * * * *